Oct. 6, 1970  W. G. FANSTONE  3,532,008
PLANETARY PROPELLER TRANSMISSION WITH SLIP COUPLINGS
Original Filed April 28, 1966  8 Sheets-Sheet 2

United States Patent Office 3,532,008
Patented Oct. 6, 1970

3,532,008
PLANETARY PROPELLER TRANSMISSION WITH SLIP COUPLINGS
William G. Fanstone, 713–2510 Portage Ave., St. James 12, Manitoba, Canada
Original application Apr. 28, 1966, Ser. No. 545,943, now Patent No. 3,404,586, dated Oct. 8, 1968. Divided and this application Aug. 23, 1968, Ser. No. 798,474
Int. Cl. F16h 3/44
U.S. Cl. 74—789                    12 Claims

ABSTRACT OF THE DISCLOSURE

A propeller hub forms the casing of the transmission in which a coupling is situated between the driven gear and the casing. Sets of transfer gears are journalled on the locking gear which may be end shifted along the drive shaft in one position to provide direct drive and in the other position to disengage said drive. Means are provided to lock the locking gear against rotation when in the disengaged position and to unlock said locking gear against rotation when in the engaged position.

My invention relates to new and useful improvements to the outboard motor transmission system. This application is a divisional application of Ser. No. 545,943, filed Apr. 28, 1966 and now Pat. No. 3,404,586 dated Oct. 8, 1968. In the various embodiments it incorporates a means for reducing propeller forward speed, a means for reducing propeller reverse speed, a means for reducing drive and propeller shaft speed above the water line. It includes a reliable means of protecting the complete transmission system from shock loads caused due to impact with foreign objects below the water line or from the stresses of overloading.

One of the principal objects of my transmission system is to provide additional speed reduction gearing which will permit relatively high powered outboard motors to be operated at an effective speed for trolling.

It is well known that when trolling the boat should be operated at a relatively low speed.

In boats equipped with relatively small horsepower motors with low pitch propellers, this is done by throttling down the motor until the required speed is obtained.

However, with higher horsepower motors (10 H.P. and over) it is difficult to reduce the speed of the boat to the required trolling speed because the propeller pitch is too high.

Furthermore, at low idling speeds, two-cycle outboard motors have a tendency to foul spark plugs and "load up" which causes the r.p.m. to vary and eventually results in the stalling of the motor.

Present practice is to tow drags behind the boat, install water brakes on the boat, or attach a device to the propeller that will cause it to cavitate and reduce its efficiency. These methods are all unreliable as they do not legislate for changing wind, current or tide and their effect on the speed of the boat.

My device overcomes the disadvantages outlined by providing a positive means of reducing the speed of the boat, and in addition, provides for adjusting the speed to suit varying operating conditions.

An additional object of my transmission is to provide for a relatvely low speed reverse motion.

This feature is desirable in high powered outboard motors as reverse maneuvering is often done in restricted areas.

In addition, on all boats with the low standard transom height, there is a tendency for incoming waves to come over the transom and into the boat when backing up.

This predicates the need for a very low speed reverse motion.

An additional object of my transmission system is to provide for the reduction in the size of the underwater gear housing by reducing the forward and reverse drive shaft speed above the water line.

The size or diameter of the underwater gear housing is dictated by the size of the larger of the two gears required to reduce the propeller shaft speed to the proper ratio to insure optimum performance.

By reducing the drive shaft speed above the water line, the gears in the underwater housing can be of similar size and the underwater housing size can be reduced accordingly.

This configuration, to be used in conjunction with an underwater housing of reduced size, can be provided as an option for an existing higher horsepower range motor which is to be used on a fast planing hull.

This would provide for an increase in efficiency and a correspondingly greater hull speed for the same amount of power.

An additional object of my transmission system is to provide a reliable means of protecting the propeller and associated shafts and transmission gearing against damage caused by impact with foreign objects or the stresses of overloading.

Outboard motors presently in service are generally protected against impact shock by the so-called cushioned hub, or shear pin, or both, which are installed between the propeller shaft and the propeller.

When the propeller blade strikes a submerged object, the cushioned hub arrests the travel of the propeller blade and the cushioned hub "winds up."

When the motor tilts, the arrested blade passes over the object. This results in the acceleration of the other blade, or blades, of the propeller and the resulting accelerated contact sometimes shears off the blade.

In this connection it should be noted that when torque overcomes friction the cushioned hub rotates within the propeller. This action introduces water between hub and propeller which lubricates the assembly eliminating all friction between said hub and propeller. This in turn allows engine r.p.m. to rapidly increase beyond safe limits. It also prohibits motion being applied to the boat in any direction which could present a hazard in adverse weather, wind, current or tide conditions.

While the shear pin generally protects the transmission system and propeller, it is difficult to replace when sheared, particularly if this has to be done on open water away from shore.

The clutch in my transmission assembly is designed to be manipulated manually to disconnect the transmission and can be varied by centrifugal, or wedging action, to suit the applied torque, and therefore provide a maximum protection to the transmission system during various operating regimes.

My clutch provides for graduated protection in relation to the applied torque, and as illustrated, will reset itself at every 15 degrees of circumferential travel. The degrees desired for loading and resetting can be varied in relation to the number of cushioning elements and corresponding ramps. In addition the degree, or progression of loading, can be varied by changes in ramp design.

The clutch can also be installed independently within the propeller. In this configuration, the clutch can be progressively loaded by wedging action or direct thrust action and provides maximum protection close to the source of impact.

The relatively small gearbox or transmission assembly, or portions of it, hereafter to be described, can readily be fitted to existing motors between the upper portion of the exhaust housing below the water pump and above the anti-cavitation plate.

Alternatively, it can be incorporated during manufacture and can be located anywhere between the power head and the propeller, above or below the water line, depending upon design parameters.

In all applications, my reduction gearing or portions of it, provides a balanced thrust with no adverse lateral loading. It maintains the alignment between the input and output shafting. It may be added to, or substituted for, existing portions of the transmission.

In addition, my transmission can be contained within the propeller and this propeller can be fitted to existing motors.

In several applications my transmission is designed to be located in, or substituted for, the extension gearcase provided for some makes of motors which are intended for use on boats with high (20 in. standard) transom height.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

In the drawings like characters of reference indicate corresponding parts in the different figures.

Figure 1:
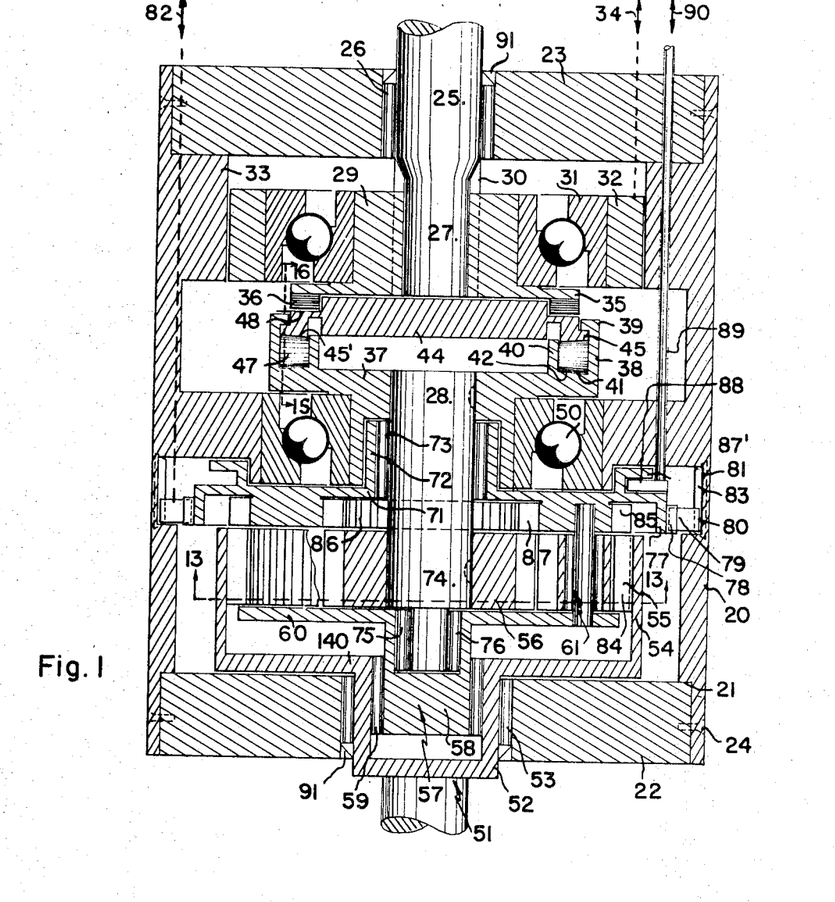
FIG. 1 is a longitudinal side section of the preferred embodiment of my transmission.

Proceeding therefore to describe the invention in detail, reference should first be made to FIG. 1 in which 20 illustrates a substantially cylindrical casing between shouldered ends 21 within which are located end plates 22 and 23 held in to position by means of screws 24 or similar means.

A main drive shaft 25 is supported within end plate 23 upon bearings 26 and extend inwardly and this drive shaft consists of a first portion 27 and a second portion 28, both portions being in alignment.

A cylindrical plate 29 is splined for slidable endwise movement, by means of spline 30 to the first portion 27 and bearing 31 surrounds this portion together with a ring 32. This ring is keyed within the casing portion 33 and is slidable within limits within this casing portion. Means are provided to move the portions 29, 31 and 32 and are shown schematically by means of the dotted line 34.

Figures 11, 15, 16:
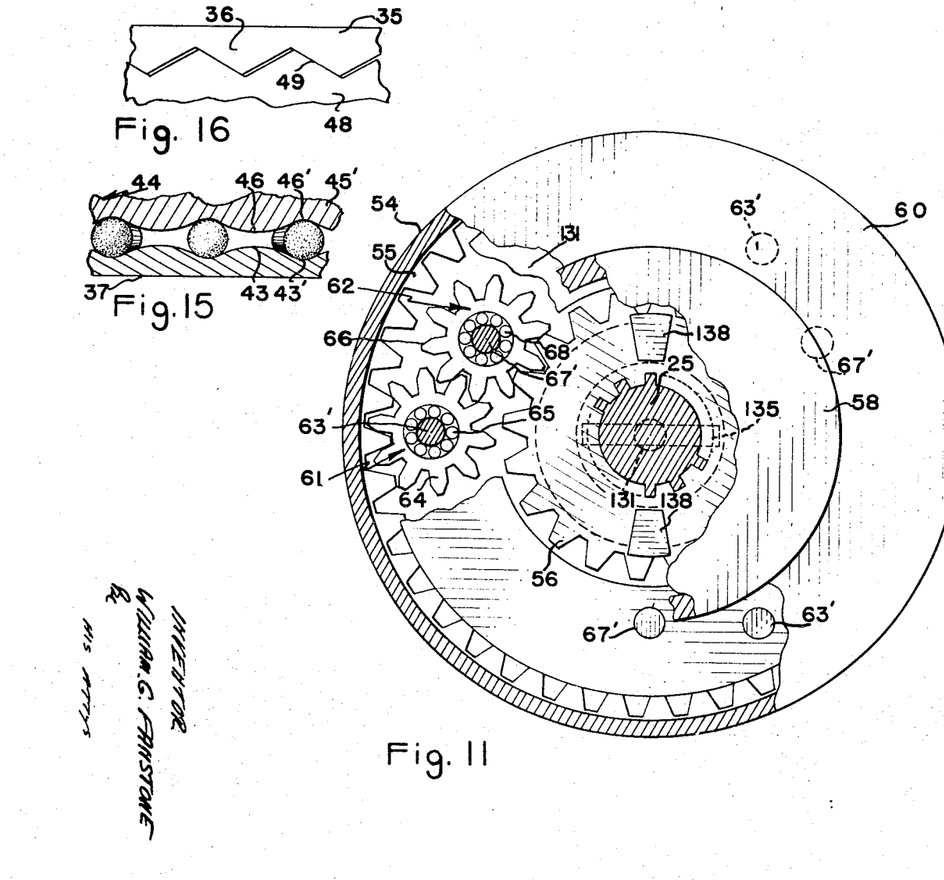
FIG. 11 is a sectional view broken away in part and taken substantially along the line 11—11 of FIG. 3.
FIG. 15 is an enlarged fragmentary section of the clutch shown in FIGS. 1 and 2 substantially along the line 15—15 of FIGS. 1 and 2.
FIG. 16 is a view similar to FIG. 15 but shown along the lines 16—16 of FIGS. 1 and 2.

A plate 35 is formed integrally with the portion 29 and the facing perimeter of this plate is provided with a plurality of radial ramps 36, details of which are shown in FIG. 16.

A radially ramped component collectively designated 37 is keyed for rotation to the second portion 28 of the drive shaft and is formed with an annular flange 38 having a down turned lip 39.

An inner annular flange 40 is formed spaced from the annular flange 38 thus defining an annular channel 41, the wall 42 of which diverges outwardly from the flange 40 towards the flange 38.

This wall 42 is also radially ramped as at 43 as the configuration is shown in FIG. 15.

An intermediate combination plate collectively designated 44 is situated between the plate 35 and the component 37, said plate 44 being provided with a projecting flange 45 which engages within the inturned lip 39 of the component 37 thus retaining same in position for independent rotary movement and longitudinal movement relative to the component 37.

An outwardly inclined perimetrical edge portion 45' is also radially ramped as at 46 (see FIG. 15) corresponding to the radially ramped surface 43 and a plurality of frusto-conical resilient elements 47 are situated between the ramped portions 46 and 43, nesting within the depressions 43' and 46' between adjacent ramps as clearly shown in FIG. 15.

A shouldered perimetrical face 48 is formed on the other face of the combination plate 44 and this surface is also radially ramped as shown at 49 in FIG. 16, these ramps corresponding to the aforementioned ramps 36.

The plate 35, the component 37, and the combination plate 44, together with the resilient elements 47 constitute a selectively engageable coupling component connecting the first portion 27 of the drive shaft to the second portion 28.

This second portion is also supported by bearings 50 as shown in FIG. 1. In operation of this portion of the device, the actuator means 34 can move the components 29, 31 and 32 away from the second portion 28 of the drive shaft so that there is no driven connection between the first portion 27 and the second portion 28.

However, when these components are moved towards the second portion 28, ramps 36 engage the corresponding depressions in the face 48 and this together with the resilient elements 47, give a driving connection to the second portion 28 of the drive shaft.

Under conditions of low torque, it will be appreciated that this coupling will slip relatively easily so that no damage should occur to the propeller or associated shafts, or gearing However, as torque increases, the ramps 36 tend to ride up the corresponding ramps 49 thus forcing the intermediate combination plate 44 into tighter engagement with the resilient elements 47 thus increasing the torque connection at this point yet still maintaining the safety feature of permitting overriding to occur in the event that the propeller strikes an object under water.

Due to the configuration of the ramps, it will be appreciated that the coupling is automatically reset each time resilient elements 47 deform and reform in the next adjacent depression or when one ramp rides over another, and that the angulation and shape of these two sets of ramps control the operating parameters of the device.

A driven gear 51 extends from the other end plate 22 and is formed with a hollow cylindrical portion 52 which is supported within the end plate 22 by means of needle bearings 53.

A further cylindrical portion 54 extends inwardly from the cylindrical portion 52 but of greater diameter and this cylindrical portion is formed with an annular internal gear ring 55 all of which lie concentrically with the drive shaft 27.

A drive gear 56 is keyed to the second portion 28 of the drive shaft and this drive gear lies in the same plane as the annular gear 55.

The driven shaft 51 together with the cylindrical portion 52 and 54 and the annular gear ring 55 form what is defined as a driven shaft assembly.

Drive connection between the drive gear 56 and the driven shaft assembly 51 is accomplished by means of a transfer gear assembly collectively designated 57. This consists of a stub shaft 58 journalled for rotation within the cylindrical portion 52 upon needle bearings 59, and a radial plate 60 formed on the inner end of the stub shaft 58.

Figure 13:
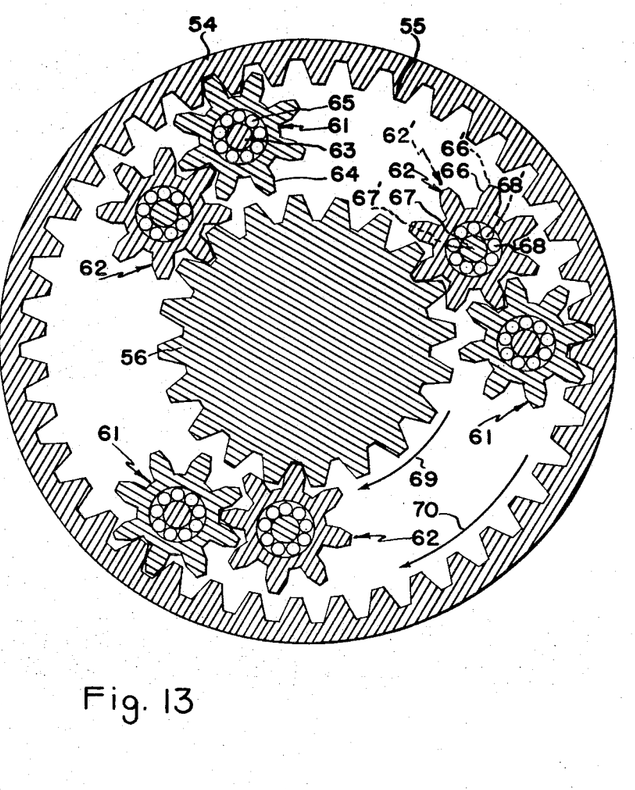
FIG. 13 is a cross sectional view substantially along the line 13—13 of FIGS. 1, 2, 3, 4, 5 and 6.
Figure 14:
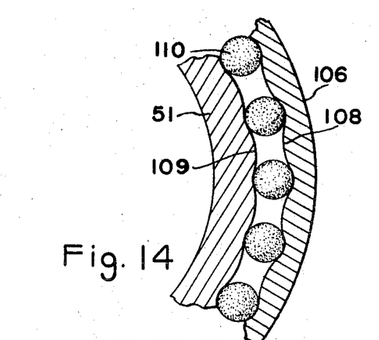
FIG. 14 is an enlarged fragmentary front elevation of the clutch shown in FIGS. 5 and 6.

This plate carries two acts of transfer gears collectively designated 61 and 62 respectively and details of these gears are shown in FIG. 13.

The first set 61 consists, in this embodiment, of three spindles 63 situated at 120° from one another and extending from the plate 60.

Gears 64 are journalled upon these spindles by means of needle bearings 65 and each of the gears 64 is in mesh with the aforementioned annular gear ring 55.

The second set of transfer gears 62 consist of three gears 66 situated 120° from one another and mounted upon spindles 67 also secured to and extending from the plate 60 but at a radius closer to the center of said plate. Needle bearings 68 mount the gears 66 upon these spindles 67.

The gears 66 engage the drive gear 56 and also the first set of transfer gears 64 so that rotation of the drive gear in the direction of arrow 69 will cause rotation of the annular gear 55 in the direction of arrow 70 so that both the drive gear and the annular gear rotate in the same direction.

However, due to the fact that the diameter of the drive gear 56 is considerably smaller than the diameter of the annular gear 55', the driven shaft 51 will rotate at a reduced speed compared to the speed of the drive shaft 25.

In order that the transfer gears will transmit power from the drive gears 56 to the driven gear assembly 51, it is of course necessary to prevent the plate 60 and hence the spindles 63 and 67 from rotating and this is accomplished by extending the aforementioned spindles and connecting same to a plate or disc 71 to which these spindles are secured.

This disc is provided with a hub 72 surrounding the second portion 28 of the drive shaft and supported thereupon by needle bearings 73 thus assisting in the support of the transfer gear assembly 57.

In this connection note should be made of the extremity 74 of the second portion 28 of the drive shaft which is in turn supported within the hollow hub portion 75 of the hub 58 by means of needle bearings 76.

The plate or disc 71 is provided with an annular flange 77 having a pair of lugs 78 extending outwardly therefrom and diametrically situated one from the other.

In the position shown in FIG. 1, these lugs engage corresponding lugs 79 which extend inwardly from an annular ring 80 situated within a recess 81 in the casing. With lugs 78 engaging lugs 79, the transfer gear assembly 57 is prevented from rotating.

However, if a neutral position is required for the transmission, it is merely necessary to permit the annular ring 80 to be moved endwise within the recess 81 and in this connection I have shown a means for moving said ring schematically as indicated by the reference character 82. This annular ring 80 is also keyed by means of key 83 to the casing to prevent the annular ring itself from rotating.

I have also provided means to effect direct drive connection between the drive shaft 25 and the driven shaft assembly 51 and in this connection I have provided a locking gear assembly 84 upon the disc or plate 71.

This locking gear assembly consists of a combination gear concentrically situated around the drive shaft 28 but spaced therefrom and having gear teeth 85 formed around the outer perimeter thereof which are capable of sliding engagement with the annular gear 55 of the driven gear assembly 51.

This combination gear 84 is provided with a recess 86 concentrically located thereon and a set of gear teeth 87 are formed internally around the wall of this recess, these gear teeth 87 being capable of sliding engagement with the gear teeth of the drive gear 56.

It will therefore be seen that if this combination gear 84 is moved to the right with respect to FIG. 1 so that teeth 85 engage the annular gear 55 and teeth 87 engage drive gear 56 then the entire assembly is locked and will rotate in direct drive provided that the aforementioned lug 78 is disengaged from the lug 79.

Means are provided to engage and disengage this gear as aforesaid and take the form of an annular flange 87' formed on the opposite face of disc 71 to the gear 84. A shifting fork 88 engages the annular recess formed by this flange 87 and is connected to an actuating rod 89 extending through the casing to a convenient location and capable of movement in the direction of double headed arrow 90.

If this rod is shifted to the right with respect to FIG. 1, the entire transfer gear assembly 57 is also moved to the right, sliding longitudinally on needle bearings 59 and 73. This disengages lug 78 from lug 79 and engages the locking gear 84 with the annular gear 55 and the drive gear 56 thus providing the aforementioned direct drive.

The assembly is completed by the addition of conventional seals 91 at each end of the casing surrounding the drive shaft 25 and the driven shaft assembly 51 as illustrated.

The transmission hereinbefore described and illustrated in FIG. 1, therefore provides a neutral position, a reduced drive in the same direction as the drive shaft and a direct drive in the same direction as the drive shaft. This structure can either be incorporated during manufacture within an outboard motor, or, alternatively, can be substituted for the conventional distance piece provided above the cavitation plate of an outboard, it being understood, of course, that when in operating position, the device is situated vertically.

Figure 2:
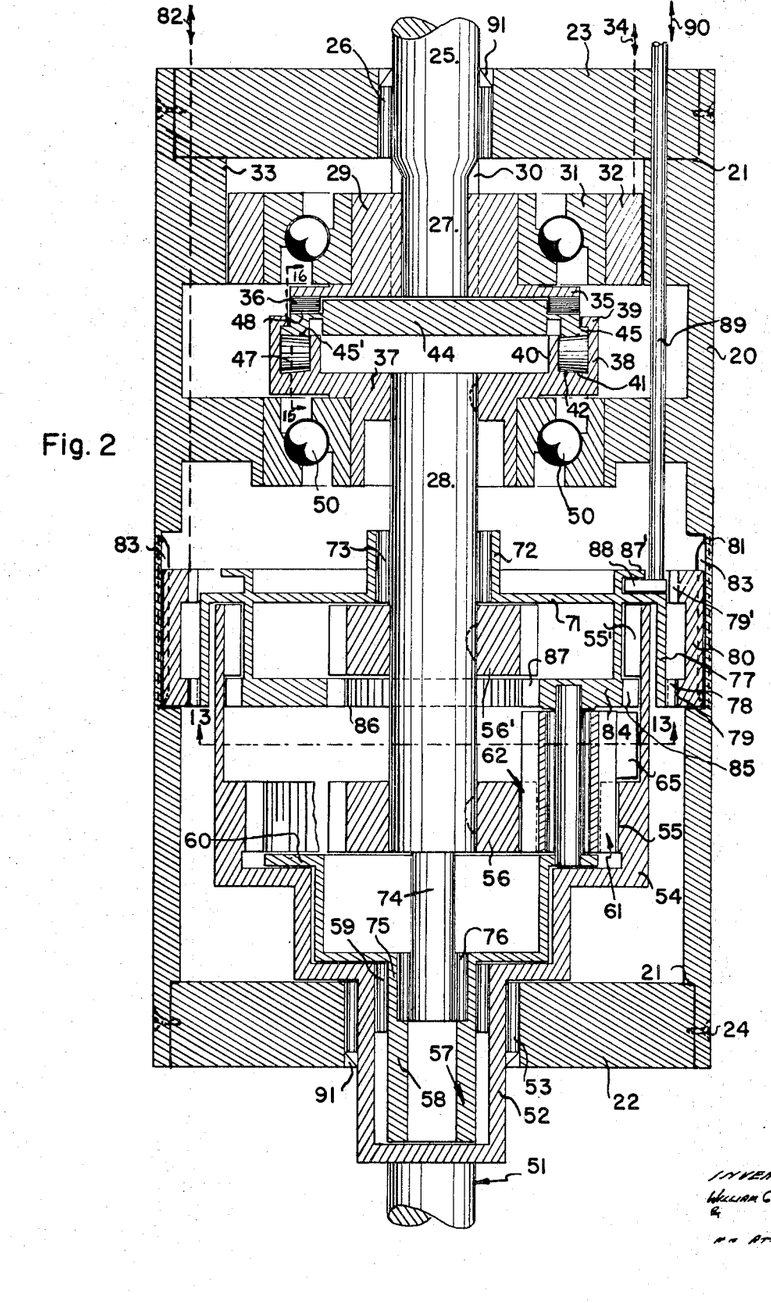
FIG. 2 is a longitudinal side section of the transmission shown in FIG. 1 but with the addition of a reduced speed reverse action.

FIG. 2 shows a similar form of transmission but with the additional provision of a reduced reverse drive.

This is usable for low speed reverse action and, due to the increased size required to accommodate the extra gearing, it normally would have to be incorporated during the manufacture of the outboard motor assembly.

In the embodiment shown in FIG. 2, a pair of spaced and parallel internal annular gear tracks or internal gear rings 55 and 55' are provided within the cylindrical portion 54.

The reduced forward drive is obtained by the transfer gear assemblies 61 and 62 as hereinbefore described engaging the annular gear tracks 55'.

The locking of the drive shaft to the driven shaft assembly by means of the combination gear 84 is accomplished by the combination gear 84 engaging the other annular track 55' and a second drive gear 56' which is also keyed to the shaft portion 28, spaced and parallel from the first drive gear 56.

However, also extending between plate or disc 60 and combination gear 84 is an extended set of transfer gears collectively designated 62' and shown in detail in FIG. 13.

These consist of gears 66' mounted upon spindles 67' by means of needle bearings 68' and the three spindles 67' are situated at 120° from one another.

Figure 12:
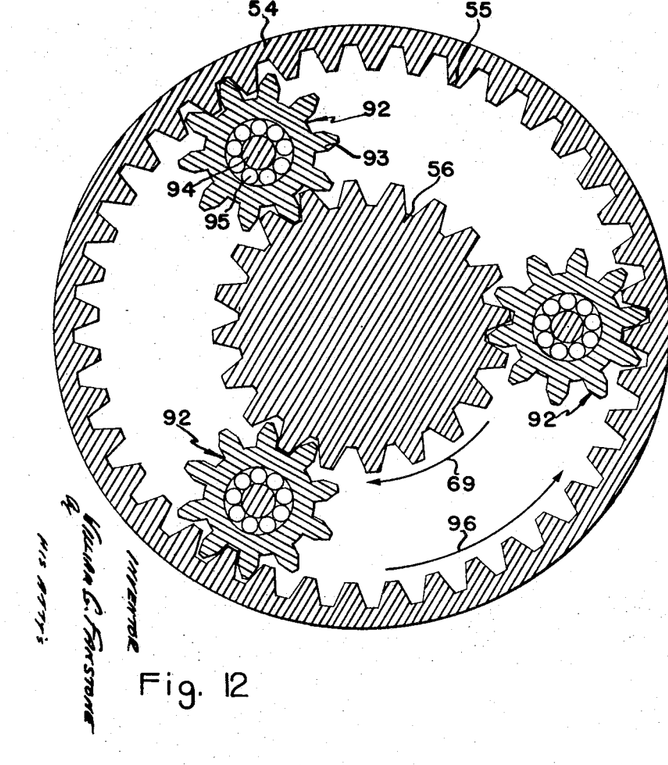
FIG. 12 is a cross sectional view substantially along the line 12—12 of FIGS. 2 and 4.

The gears 66' are approximately twice the length of the first mentioned transfer gears 66 and engage the internal annular gear 55' and the drive gear 56' thus causing the annular gear and hence the driven shaft assembly 51 to rotate in the opposite direction as indicated by arrow 96 in FIG. 12.

In this connection note should also be made of the annular ring 80 which is wider than the ring hereinbefore described and is provided with pairs of diametrically situated lugs 79 and 79' spaced apart from one another as clearly shown.

However, this annular ring is also keyed for endwise movement within the housing by means of key 83 and can be actuated as indicated schematically by the double headed arrow and dotted line 82.

In the position shown in FIG. 2, the transmission is in the reduced reverse drive position. End shifting the transfer gear assembly 57 to the left with respect to FIG. 2, by means of shift rod 89, first disengages lug 78 from lug 79 and then engages the combination gear 84 between the annular gear track 55' and the drive gear 56' thus giving direct forward drive.

Continued movement to the left passes the combination gear 84 clear through the annular track 55' and the drive gear 56' so that lug 78 of the anti-rotation assembly now engages lug 79' thus preventing rotation of the transfer gear assembly 57. At the same time gears 61 and 62 collectively engage the annular gear track 55' and the drive gear 56', and the transfer gears 66' pass out of engagement of the annular gear track 55 and the drive gear 56 thus giving reduced forward gear action.

Movement of the annular ring 80 from the position shown in FIG. 2 so that the lugs 79 disengage from the lugs 78 also provides a neutral position.

In both of the embodiments described in FIGS. 1 and 2, the neutral position is provided by movement of the annular ring 80.

However, it will be appreciated that by increasing the clearance between the combination locking gear 84 and the annular gear 55 and drive gear 56, thus permitting the lugs 78 and 79 to disengage prior to the locking gear engaging, will give an alternative construction for the neutral position.

Figure 5:
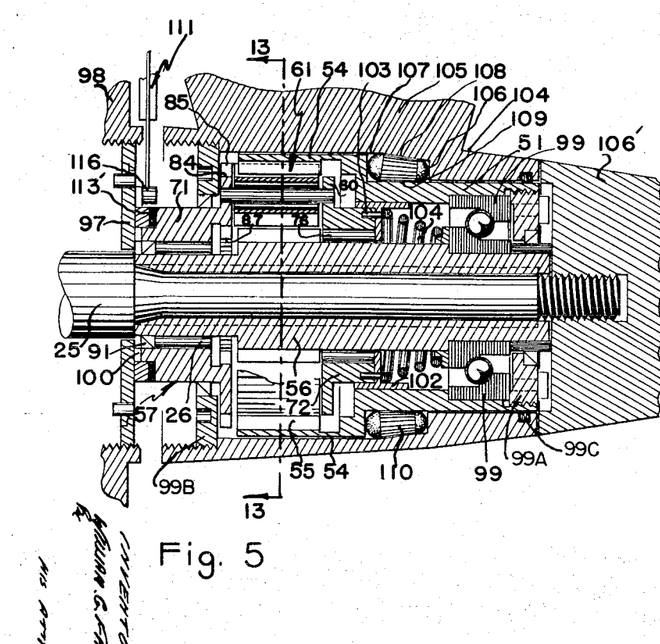
FIG. 5 is a longitudinal side section of an embodiment of my invention incorporated within a propeller hub and shown in the reduced forward drive position.
Figure 6:
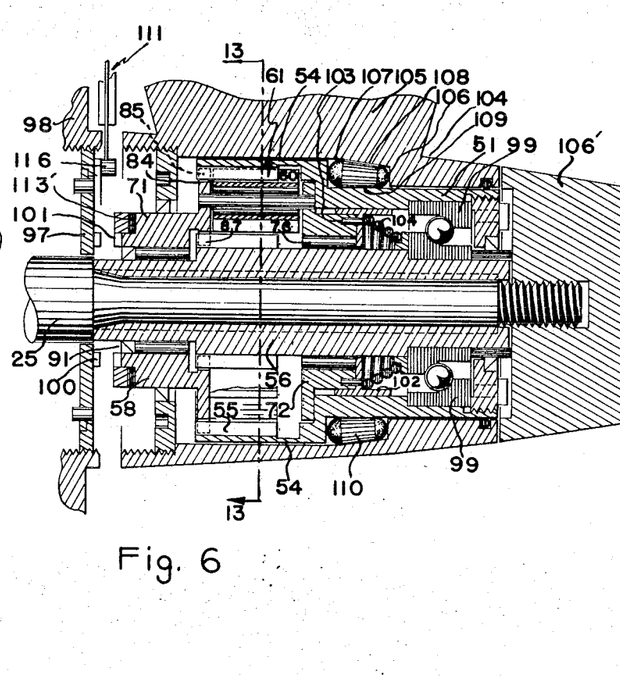
FIG. 6 is a view similar to FIG. 5 but shown in the direct drive position.
Figure 6A:
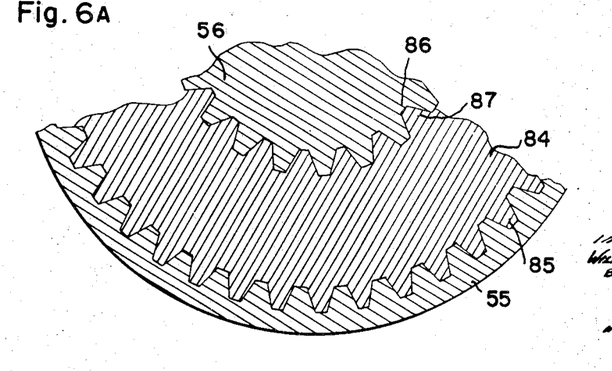
FIG. 6A is partial vertical cross section view taken through the direct drive means of FIG. 6.

FIGS. 5 and 6 show the same principle of transmission incorporated within the hub of a propeller rather than in the vertical transmission portion of the outboard motor assembly.

In this instance, the drive shaft 25 extends from the base of the outboard motor assembly and through a housing plate 97 which is screw threadably engageable within the conventional under water housing 98.

Reference character 51 illustrates the corresponding driven shaft assembly in this embodiment which is concentrically located around the drive shaft 25, bearings 99 supporting this cylindrical portion upon the drive shaft.

Reference character 57 illustrates the transfer gear assembly and although the proportions are slightly different from FIGS. 1 and 2, nevertheless the construction and mounting of this transfer gear assembly is similar so that similar reference characters have been utilized.

However, in this embodiment, instead of the antirotation ring and lugs being situated angularly within the casing, a pair of fixed lugs 100 extend rearwardly from the housing plate 92 and are engaged by corresponding lugs 101 extending fowardly from the hub 58 of the transfer gear assembly 57. These lugs are shown engaged with one another in FIG. 5 so that the transfer gear assembly is prevented from rotating.

A cylindrical phosphor-bronze bearing 102 surrounds and is secured to the cylindrical shoulder 72 of the transfer gearing assembly by means of dowels 103 and a coil spring 104 surrounds the drive shaft and reacts between the bearing 99 and this phosphor-bronze bearing 102 thus normally maintaining the transfer gear assembly in the position shown in FIG. 5 under which circumstances the transfer gear assembly transmits power from the drive gear 56 to the driven shaft assembly 51 at a reduced rate of speed in a forward direction.

The casing in this instance becomes the propeller hub 104 having conventional propeller blades 105 extending therefrom and a spinner cone and nut assembly 106' is used to secure propeller assembly to propeller driveshaft and for streamlining purposes.

The coupling connection between the driven shaft assembly 51 and the propeller housing 104 utilizes similar resilient frusto-conical members as hereinbefore described.

The interior of the propeller housing 104 is provided with a verticle shoulder 106 and a corresponding verticle shoulder 107 is formed on the outer surface of the driven shaft assembly 51.

The wall 108 of the propeller housing between shoulders 106 and 107 inclines forwardly and the shoulders 106 and 107, together with the wall portion 108 and the wall portion 109 of the driven shaft assembly 51 defines an annular recess within which a plurality of frusto-conical resilient elements 110 are situated.

These resilient elements 110 provide a frictional connection between the propeller housing and the driven shaft assembly and as the propeller rotates, the torque urges the propeller housing forwardly thus tightening the frictional connection therebetween so that the greater the thrust, the greater the frictional connection between the driven shaft assembly 51 and the propeller housing 105.

Means collectively designated 111 are provided to move the transfer gear assembly together with the locking or combination gear 84, rearwardly so that the combination gear 84 can engage the annular gear 55 and the drive gear 56 thus providing direct drive.

The transmission is shown in this position in FIG. 6 and it will be noted that the spring 104 has been compressed so that when the operating mechanism 111 is released, the spring will return the transmission to the reduced forward drive position shown in FIG. 5.

Figure 7:
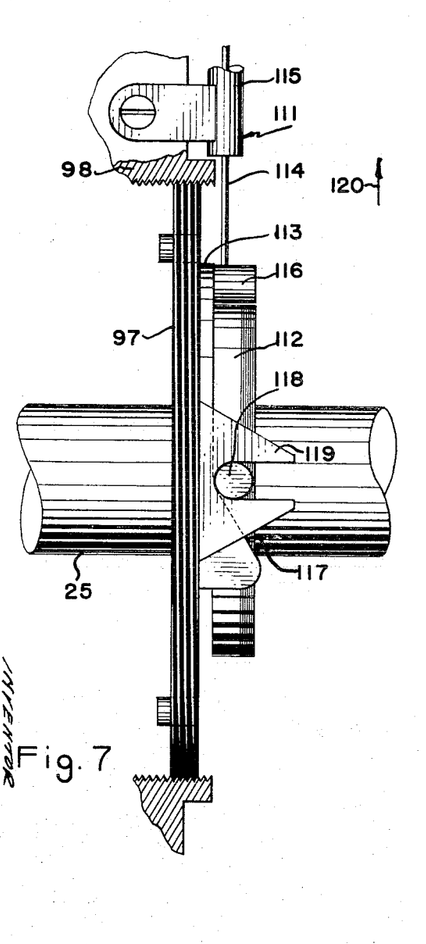
FIG. 7 is an enlarged side elevation of one embodiment of the shifting mechanism shown in FIGS. 5 and 6.
Figure 8:
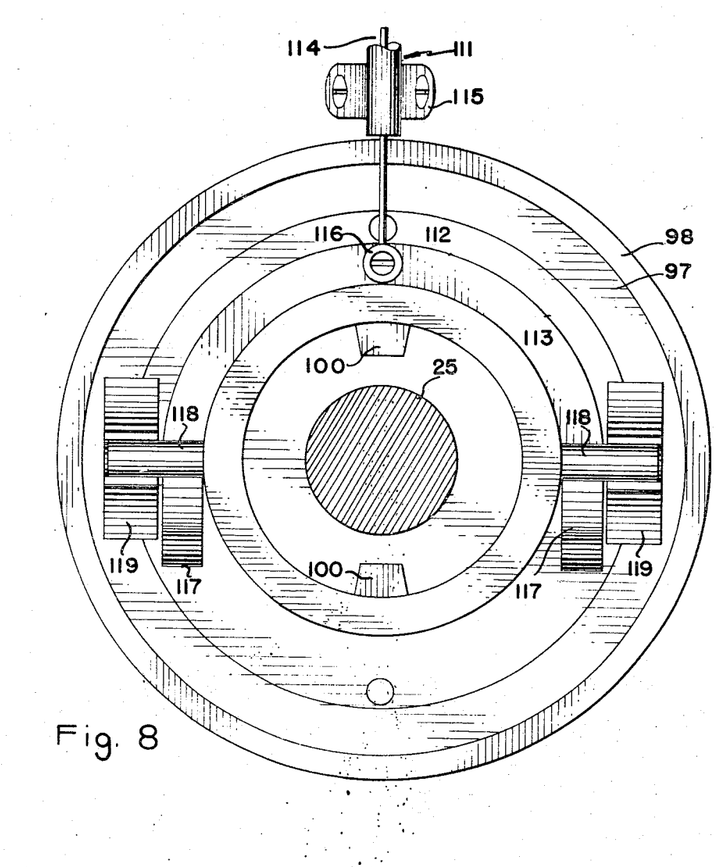
FIG. 8 is a front elevation of FIG. 7.

FIGS. 7 and 8 show one embodiment of this shifting mechanism and this is the preferred embodiment if the transmission within the hub is to be utilized upon existing outboard motors.

A thrust ring 112 surrounds the drive shaft 25 freely and is adapted to engage the vertical annular surface 113' of the hub or plate 71 of the transfer gear assembly.

A yoke 113 is situated between this thrust ring and the housing plate 97. A cable or shaft 114 extends through a sheave 115 and it connects to the upper portion of the yoke by means of ferrule 116.

The arms of the yoke are provided with inclined ramps 117 adjacent the lower end thereof and these ramps engage trunnions 118 extending outwardly from the thrust ring 112 and running within parallel guides 119 extending rearwardly from the housing plate 97.

If the cable or rod 114 is moved upwardly in the direction of arrow 120, the ramps 117 engage the trunnions and urge the thrust ring 112 rearwardly thus moving the transfer gear assembly and hence the combination locking gear into engagement for direct drive.

As soon as the cable or rod 114 is released, the spring 104 returns the mechanism to the position shown in FIG. 5 as hereinbefore mentioned.

Figure 9:
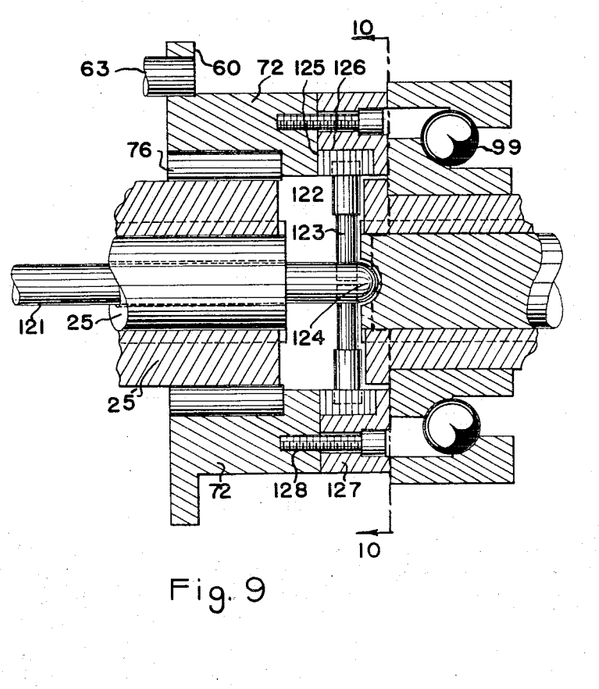
FIG. 9 is an enlarged fragmentary side section of an alternative embodiment of the shifting mechanism for the transmission shown in FIGS. 5 and 6.
Figure 10:
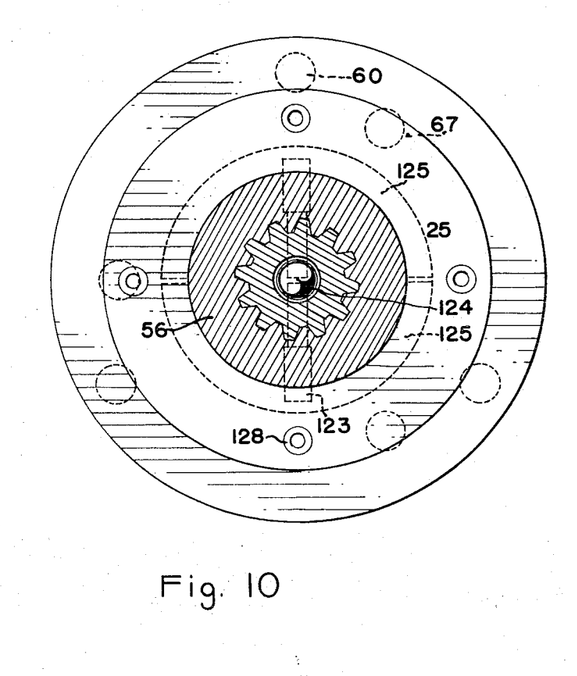
FIG. 10 is a section substantially along the line 10—10 of FIG. 9.

If, however, the transmission within the propeller hub is manufactured for incorporation within the outboard motor initially, then an alternative method of shifting can be utilized as illustrated in FIGS. 9 and 10.

In this embodiment, the spring is eliminated and the bearings 99 are moved forwardly against the hub 72 of the transfer gear assembly.

The drive shaft together with the sleeve 25' splined fixedly thereto, is provided with an axial drilling through with an actuating rod 121 extends. The drive shaft is radially slotted as at 122 and a pair of diametrically situated pins 123 extend from the end 124 of the actuating rod 121 and engage within semi-circular annular rings 125 which are situated within a shouldered recess 126 in a ring 127 secured to the rear of hub 72 by means of screws 128.

This provides a positive endwise shifting of the transfer gear mechanism and the combination locking gear from the position shown in FIG. 5 to the position shown in FIG. 6 and vice versa, the cylindrical shoulder or hub 72 together with the locking gear 84 sliding along the sleeve 25′ on the needle bearings 76 and 26.

If a more positive drive connection is required between the driven shaft assembly 51 and the propeller housing or casing 105, a ramp illustrated in partial section in FIG. 16 and as described in FIG. 1, may be installed with one portion of the ramp attached to drive shaft assembly 51 and the mating half installed in propeller housing 105. Regardless of whether the coupling is progressively loaded by increasing thrust, or by increasing torque, the coupling resets itself after the resilient elements 110 ride over the adjacent ramps.

Figure 3:
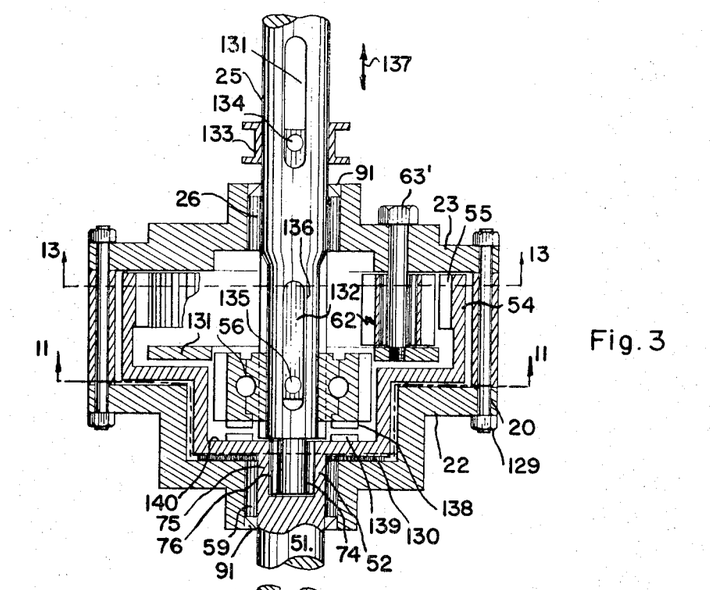
FIG. 3 is a longitudinal side section of an alternative embodiment of my transmission.
Figure 4:
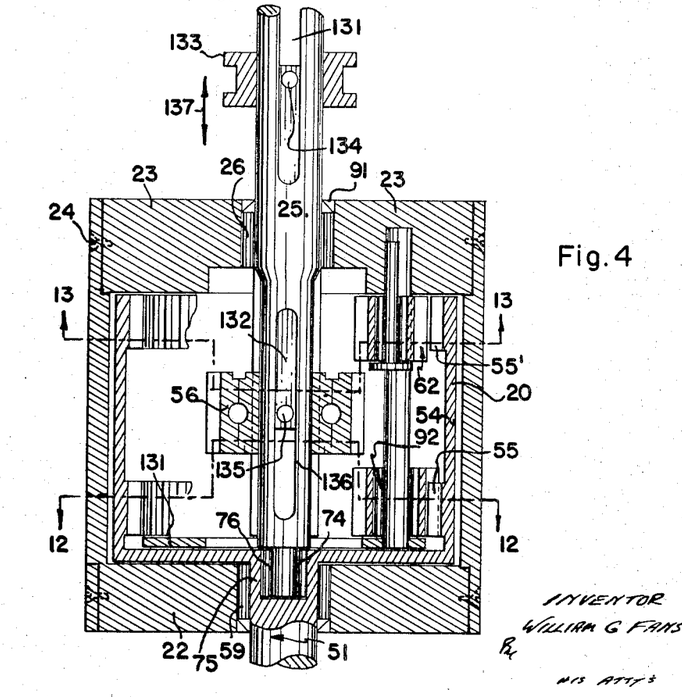
FIG. 4 is a longitudinal side section of a further embodiment of my invention.

The embodiments shown in FIG. 3 and 4 are designed to be attached to or installed in existing motors if desired. They utilize similar principles but are somewhat simpler in construction and may find application under certain circumstances.

Dealing first with FIG. 3, the casing 20 has the ends 22 and 23 secured together by means of bolts 129.

The drive shaft 25 extends into the casing and is supported at the opposite end 74 thereof within needle bearings 76 and within the driven shaft assembly 51.

A spacer plate 130 maintains the position of the driven shaft assembly 51 and is in the form of a thrust plate.

The first and second sets of transfer gears 61 and 62 are mounted upon spindles in the form of bolts 63′ and 67′ extending through the casing end 23 and being supported at the other end by an annular ring 131 within which the ends of the bolts engage.

The drive gear 56 is splined to the drive shaft 25 for endwise movement therealong and the drive shaft is provided with an axially located drilling 131′ within which extends an operating rod 132.

An actuating sheave 133 extends around the drive shaft and is connected to one end of rod 132 by means of pin 134.

Further pins 135 extend from the other end of rod 132, through slots 136 within the drive shaft, and are secured to the drive gear 56.

A conventional actuating fork (not illustrated) engages sheave 133 and provides endwise movement thereto in the direction of double headed arrow 137 so that the drive gear can be moved endwise upon the drive shaft 25.

When in the position shown in FIG. 3, the transmission is in the neutral position.

If the drive gear 56 is moved leftwardly with relation to FIG. 3, the drive gear engages the transfer gears 66 thus providing reduced forward drive to the transmission. This is illustrated in FIG. 11.

Dog clutch elements 138 are formed upon one face of the drive gear 56 and corresponding dog clutch elements 139 are formed upon the inner face 140 of the hub of the driven gear assembly 51.

Therefore if the drive gear is moved to the right with reference to FIG. 3, these dog clutch elements engage one another thus providing direct drive to the transmission.

Figure 17:
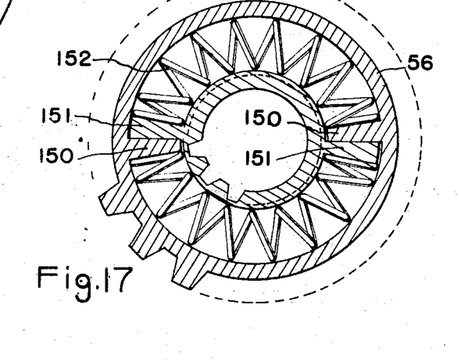
FIG. 17 is a cross sectional end view of the drive gear of FIGS. 3 and 4 and showing the shock absorber construction.
Figure 18:
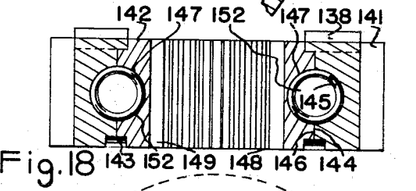
FIG. 18 is a cross sectional view substantially along the line 18—18 of FIG. 17.

I prefer to mount the drive gear 56 to the drive shaft 25 by means of cushioned hub assembly, details of which are shown in FIGS. 17 and 18.

In FIGS. 17 and 18 it will be seen that I have formed the drive gear 56 of an outer cylinder 141 and an inner cylinder 142, the outer cylinder sliding over the inner cylinder and being retained in position by conventional means such as spring clip 143.

The outer cylinder has formed upon the inner wall 144 thereof a semi-circular annular recess 145.

Similarly the inner cylinder has formed upon the outer wall 146 thereof a semi-circular annular recess 147 so that when the cylinders are assembled as illustrated in FIGS. 17 and 18 the semi-circular recesses 145 and 147 provide an annular circular channel around.

These semi-circular channels 145 and 147 are preferably situated intermediate the sides 148 and 149 of the cylinders.

Extending inwardly from the inner wall 144 of the outer cylinder is a pair of lugs 150 situated diametrically opposite one another and extending outwardly from the outer wall 146 of the inner cylinder is a corresponding pair of lugs 151 also diametrically opposite one another so that normally these lugs 150 and 151 engage one another and provide positive drive connection between the two cylinders 141 and 142.

Coil springs 152 extend from the side of one lug 150 to the side of the diametrically opposite lug 151 so that if the transmission is shifted into direct or reduced drive while drive gear 56 is rotating or if the propeller strikes an object while rotating, the lugs 150 and 151 separate against pressure of the coil springs thus causing a cushioned effect and preventing damage from occuring.

The embodiment shown in FIG. 3 can provide reduced forward drive, neutral drive, or direct drive.

FIG. 4 is similar with the exception that provision is made for a reverse instead of direct drive.

In this instance, reference should be made to FIG. 2 in which the annular gear assembly of the drive shaft assembly 51 is provided with a pair of tracks 55 and 55′.

FIGS. 12 and 13 show the sections of the first and second transfer gear assemblies 61 and 62 and the section of the reverse gear assemblies 92 respectively.

The transfer gears 61 and 62 are mounted upon spindles extending from the end plate 23 of the casing and the drive gear 56 can be shifted from the neutral position shown in FIG. 4, either leftwardly with respect to FIG. 5 thus giving reduced forward drive or rightwardly with respect to FIG. 4 thus giving reduced reverse drive.

This particular embodiment is designed specifically for use in fast planing hulls.

In all embodiments previously described, it will be appreciated that the gear teeth which engage and disengage one another should be chamfered according to conventional practice to facilitate the engagement one with the other.

With the exception of option detailed in FIG. 4, it is also to be understood that all configurations incorporating the reduced speed drive, the shifting mechanism used to shift the transmission into low gear is synchronized with the throttle control incorporated in the motor to control the r.p.m. while shifting the motor into forward or reverse gear. However, as this synchronization is conventional, it has not been deemed necessary to show details thereof.

The power output of the motor is controlled in this manner as only a fraction of the horsepower generated by the motor is required during the low speed operation.

This allows the majority of the gears and associated parts of the transmission assembly to be of die cast or plastic construction, or both, thus materially reducing the manufacturing costs and in consequence increasing the marketing potential.

The transmission shown in FIGS. 5 and 6 can be operated successfully with water as a lubricant inasmuch as the transfer gears and bearings can be manufactured from plastic.

This facilitates the manufacture and obviates the need for providing lubrication, seals and grease plugs, etc.

Finally, referring back to FIG. 4, the drive gear 56 should be provided with the cushioned assembly hereinbefore described and shown in FIGS. 17 and 18.

In this connection it should be noted that when torque overcomes friction the cushioned hub rotates within the propeller. This action introduces water between hub and propeller which lubricates the assembly eliminating all friction between said hub and propeller. This in turn allows engine r.p.m. to rapidly increase beyond safe limits. It also prohibits motion being applied to the boat in any direction which could present a hazard in adverse wind, weather, current or tide conditions.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What I claim as my invention is:

1. An outboard motor transmission adapted to be operated by said outboard motor and to drive the associated propeller, said transmission comprising in combination a casing, said casing forming the propeller hub and driven shaft assembly, a drive shaft extending from the base of said outboard and into said casing, a drive gear keyed to said drive shaft within said casing, a driven gear assembly journalled for rotation on said drive shaft, coupling means between said driven gear assembly and said casing, said driven gear assembly including an internal annular gear ring, surrounding and being radially spaced from said drive gear, a first set of transfer gears journalled for rotation within said casing and meshing with said annular gear ring, a second set of transfer gears journalled for rotation within said casing and meshing with said first set of transfer gears and with said drive gear thereby providing the same direction of rotation to said drive shaft and said casing, and a locking gear assembly journalled for rotation on said drive shaft and end shiftable therealong for selective engagement and disengagement simultaneously with said drive gear and said annular gear ring, to lock same together for simultaneous rotation thereby providing a direct drive, said locking gear assembly including a combination gear having gear teeth formed around the outer perimeter thereof selectively engageable with said annular gear ring, a concentrically located cylindrical recess on one face of said combination gear, internal gear teeth formed around the wall of said recess and being selective engageable with said drive gear, means to selectively end shift said locking gear assembly along said drive shaft to the drive gear and annular gear engaging position and to the drive gear and annular gear disengaging position, means journalling said sets of transfer gears on said locking gear, and means to lock said locking gear assembly against rotation when said locking gear assembly is in the said disengaging position and to release said locking gear assembly for rotation when said locking gear assembly is in said engaging position.

2. The device according to claim 1 in which said means to lock said locking gear assembly against rotation when said locking gear assembly is in the said disengaged position, comprises at least one lug on the front face of said locking gear assembly, at least one lug extending from said base, said lugs engaging one another when said locking gear assembly is in said disengaging position and disengaging from one another when said locking gear assembly is in said engaging position.

3. The device according to claim 2 which includes two sets of spindles extending from one face of said combination gear, said first and second transfer gears being journalled for rotation on said spindles.

4. The device according to claim 2 in which said coupling means comprises an annular recess defined by the outer surface of part of said annual gear ring and the inner surface of said casing and opposite the spaced shoulders formed on said annual gear ring and said casing, at least one of said surfaces inclining towards the other, said surfaces being multi-ramped, and a plurality of resilient coupling elements situated in the depressions between said ramps.

5. The device according to claim 3 in which said coupling means comprises an annular recess defined by the outer surface of part of said annular gear ring and the inner surface of said casing and opposite the spaced shoulders formed on said annular gear ring and said casing, at least one of said surfaces inclining towards the other, said surfaces being multi-ramped, and a plurality of resilient coupling elements situated in the depressions between said ramps.

6. The device according to claim 1 in which said means to selectively end shift said locking gear assembly includes a yoke partially surrounding said drive shaft adjacent said base of said outboard, ramps on the ends of said yoke, a thrust plate surrounding said drive shaft and engaging said front face of said locking gear assembly, trunnions extending from said first plate, guides extending from said base, said trunnions engaging said guides and permitting endwise movement of said thrust plate, said ramps also engaging said trunnions, means to move said yoke upwardly hence urging said thrust plate and said locking gear assembly rearwardly, and means to return said locking gear assembly forwardly when said means to move said yoke upwardly is released.

7. The device according to claim 6 in which said means to return said locking gear assembly forwardly comprises a coil spring surrounding said drive shaft and reacting against the rear side of said locking gear assembly.

8. The device according to claim 6 in which said coupling means comprises an annular recess defined by the outer surface of part of said annular gear ring and the inner surface of said casing and opposite the spaced shoulders formed on said annular gear ring and said casing, at least one of said surfaces inclining towards the other, said surfaces being multi-ramped, and a plurality of resilient coupling elements situated in the depressions between said ramps.

9. The device according to claim 7 in which said coupling means comprises an annular recess defined by the outer surface of part of said annular gear ring and the inner surface of said casing and opposite the spaced shoulders formed on said annular gear ring and said casing, at least one of said surfaces inclining towards the other, said surfaces being multi-ramped, and a plurality of resilient coupling element situated in the depressions between said ramps.

10. The device according to claim 1 in which said means to selectively end shift said locking gear assembly includes a rod extending axially through said drive shaft, said drive shaft being longitudinally apertured to receive said rod, a pair of diametrically situated slots formed in said drive shaft and communicating with said longitudinal aperture, a pair of pins secured to and extending from said drive shaft and through said slots, said pins engaging said locking gear assembly.

11. The device according to claim 10 in which said coupling means comprises an annular recess defined by the outer surface of part of said annular gear ring and the inner surface of said casing and opposite the spaced shoulders formed on said annular gear ring and said casing, at least one of said surfaces inclining towards the other, said surfaces being multi-ramped, and a plurality of resilient coupling elements situated in the depressions between said ramps.

12. The device according to claim 1 in which said coupling means comprises an annular recess defined by the outer surface of part of said annular gear ring and the inner surface of said casing and opposite the spaced shoulders formed on said annular gear ring and said casing, at least one of said surfaces inclining towards the other, said surfaces being multi-ramped, and a plurality of resilient coupling elements situated in the depressions between said ramps.

References Cited
UNITED STATES PATENTS

| | | | |
|---|---|---|---|
| 1,436,817 | 11/1922 | Ovren | 74—789 |
| 2,539,630 | 1/1951 | Krueger et al. | |
| 2,765,040 | 10/1956 | Darrah. | |
| 2,856,797 | 10/1958 | Dassance | 74—789 |
| 3,404,586 | 10/1968 | Fanstone | 74—750 |

BENJAMIN W. WYCHE, III, Primary Examiner

U.S. Cl. X.R.

64—28; 170—135.75; 192—3.6